(12) United States Patent
Kimpe (10) Patent No.: US 11,902,504 B2
(45) Date of Patent: Feb. 13, 2024

(54) METHOD AND SYSTEM FOR MAPPING THE NON-UNIFORMITY OF AN IMAGE SENSOR

(71) Applicant: BARCO N.V., Kortrijk (BE)

(72) Inventor: Tom Kimpe, Landegem (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 17/264,378

(22) PCT Filed: Jul. 26, 2019

(86) PCT No.: PCT/EP2019/070284
§ 371 (c)(1),
(2) Date: Jan. 29, 2021

(87) PCT Pub. No.: WO2020/025509
PCT Pub. Date: Feb. 6, 2020

(65) Prior Publication Data
US 2021/0281829 A1  Sep. 9, 2021

(30) Foreign Application Priority Data
Jul. 31, 2018  (GB) ...................................... 1812446

(51) Int. Cl.
*H04N 17/02* (2006.01)
*H04N 17/00* (2006.01)
(Continued)

(52) U.S. Cl.
CPC ......... *H04N 17/002* (2013.01); *G06T 7/0002* (2013.01); *G06T 7/80* (2017.01); *H04N 23/695* (2023.01)

(58) Field of Classification Search
CPC .... H04N 17/002; H04N 5/23299; G06T 7/80; G06T 7/0002
(Continued)

(56) References Cited

U.S. PATENT DOCUMENTS 8,406,562 B2 * 3/2013 Bassi .................. H04N 9/3185
348/222.1
9,325,861 B1 * 4/2016 Ettinger ............. H04N 1/00183
(Continued)

FOREIGN PATENT DOCUMENTS

| CN | 1482513 A | 3/2004 |
|---|---|---|
| CN | 103765503 A | 4/2014 |

(Continued)

OTHER PUBLICATIONS

International Preliminary Report on Patentability in corresponding PCT Application No. PCT/EP2019/070284 dated Feb. 11, 2021.
(Continued)

*Primary Examiner* — Trang U Tran
(74) *Attorney, Agent, or Firm* — HAMRE, SCHUMANN, MUELLER & LARSON, P.C.

(57) ABSTRACT

A method for mapping non-uniformities of a portable image sensor having image sensor elements, each image sensor element having a coordinate. The method including the image sensor capturing images of a property from a test pattern using different image sensor elements. The non-uniformity of the image sensor can be mapped by storing the values of the property with the respective image sensor element coordinates in a look-up table.

24 Claims, 2 Drawing Sheets

(51) Int. Cl.
    *G06T 7/80* (2017.01)
    *G06T 7/00* (2017.01)
    *H04N 23/695* (2023.01)

(58) Field of Classification Search
    USPC .......................................................... 348/188
    See application file for complete search history.

(56) References Cited

U.S. PATENT DOCUMENTS

| | | |
|---|---|---|
| 9,990,739 B1 | 6/2018 | Chuang et al. |
| 2008/0292131 A1 | 11/2008 | Takemoto et al. |
| 2013/0107059 A1 | 5/2013 | Baba et al. |
| 2016/0292376 A1 | 10/2016 | Sudo |
| 2017/0280135 A1 | 9/2017 | Shroff et al. |
| 2017/0359560 A1 | 12/2017 | Winn et al. |
| 2018/0158213 A1 | 6/2018 | Shen et al. |

FOREIGN PATENT DOCUMENTS

| | | |
|---|---|---|
| CN | 105096324 A | 11/2015 |
| CN | 108028895 A | 5/2018 |
| WO | 2017213685 A1 | 12/2017 |

OTHER PUBLICATIONS

ISR and Written Opinion in corresponding PCT Application No. PCT/EP2019/070284 dated Oct. 31, 2019.
GB Search Report in corresponding GB Application No. 1812446.1, dated Jan. 31, 2019.
Anonymous, Camera Calibration with OpenCV, XP055634187, Jun. 23, 2018, pp. 1-12.
European Office Action issued in corresponding European Patent Application No. 19752652.8, dated Nov. 16, 2022, 9 pages.
Scherfgen et al., "Camera-Based 3D Pointing Technique Using Dynamic On-Screen Markers," Thesis, Bonn-Rhein-Sieg Unv. of Applied Sciences, Jun. 15, 2015, XP055368421. Abstract.
Office Action issued in corresponding Chinese Application No. 2019800512284, dated Aug. 25, 2023, with machine translation.

* cited by examiner

METHOD AND SYSTEM FOR MAPPING THE NON-UNIFORMITY OF AN IMAGE SENSOR

TECHNICAL FIELD

The present invention relates to methods and systems for visualization with compensation for non-uniformities of an image sensor.

BACKGROUND

Visualization solutions for professional applications often require stringent quality and performance requirements. For many fields these displays need to be accurately calibrated to special standards (for example, the DICOM GSDF standard for medical displays) and periodic quality assurance tests need to be performed to verify that a correct calibration state is maintained. Such calibration and quality assurance tests require accurate optical measurements of the display behaviour. Typically, high quality and expensive measurement equipment (e.g. colorimeters and spectrometers) can be used to perform these measurements. The measurement equipment can be kept external or be built into the display system.

Consumer display systems have improved in quality, and an increased number of consumer display systems are being used for professional applications. These displays are normally not equipped with the accurate but more expensive type of optical measurement systems for performing quality assurance and calibration.

Despite the last few years' increase in quality of embedded digital cameras, such as smartphone cameras, they still prove insufficient to calibrate visualization solutions for professional applications. For example, the inherent quality and repetitiveness of embedded digital camera images have been insufficient. Embedded digital cameras suffer, for example, from significant and unknown (device dependent) lens non-uniformity, which influences the measurements. Camera parameters are normally automatically being set for each image taken, which results in a low level of repeatability. Hence, it is not suitable to use an embedded digital camera to measure reliable characteristics of an external display and use this for quality assurance and calibration purposes.

Patent application US20160292376A1 discloses a method for performing calibration of a medical display using a smartphone. They do not discuss how to calibrate the smartphone camera itself.

Patent application US20170359560A1 or WO2017/213685 discloses generating a composite image from a physical item such as a paper photo, by establishing a correspondence between pixels of a first image and pixels of each of subsequent images. This method describes a computer-implemented method which includes capturing, with a camera, a first image of a physical item at a first camera position, detecting borders associated with the physical item, based on the first image, generating an overlay that includes a plurality of objects that are positioned within one or more of the borders associated with the physical item, capturing, with the camera, subsequent images of the physical item, where each subsequent image is captured with a respective subsequent camera position, and during capture of the subsequent images, displaying an image preview that includes the overlay. The method further includes establishing correspondence between pixels of the first image and pixels of each of the subsequent images and generating a composite image of the physical item, where each pixel value of the composite image is based on corresponding pixel values of the first image and the subsequent images. However, the method described is used for the removal of glare of physical photographs which are to be converted to electronic versions.

SUMMARY OF THE INVENTION

It is an objective of the present invention to provide a method for mapping non-uniformities of an image sensor, such as a portable image sensor, in each case comprising image sensor elements in an image sensor area, whereby each image sensor element can have a coordinate and can be configured to image a property from a test pattern.

The method can comprise the steps of, for at least two different sets of image sensor elements imaging the same test pattern:

positioning the image sensor, such as the portable image sensor, such that the set of image sensor elements can image the test pattern, and capturing an image of the test pattern, and registering the property from the test pattern and image sensor element coordinate, and mapping the non-uniformities of the image sensor, such as the portable image sensor, by storing the values of each registered property and image sensor element coordinate in a look-up table.

A preferred step in the method described above, is of providing relative movement between the image sensor and the test pattern (such as providing relative movement between the portable image sensor and the test pattern) followed by positioning the image sensor (or positioning the portable image sensor), such that the set of image sensor elements can image the test pattern. The step of relative movement of the image sensor, such as the portable image sensor, with respect to the test pattern, can include moving the image sensor, such as the portable image sensor, and positioning the image sensor, such as the portable image sensor, so that the set of image sensor elements can image the test pattern.

Thus, the above steps can become:

for at least two different sets of image sensor elements imaging the same test pattern: moving the image sensor, such as the portable image sensor, and positioning the image sensor, such as the portable image sensor, such that the set of image sensor elements can image the test pattern, and capturing an image of the test pattern, and registering the property from the test pattern and image sensor element coordinate, and mapping the non-uniformities of the image sensor, such as the portable image sensor, by storing the values of each registered property and image sensor element coordinate in a look-up table.

Moving the image sensor, such as the portable image sensor, with respect to the test patterned is usually easier to perform than moving the test pattern with respect to the image sensor, such as the portable image sensor.

The method enables the possibility to map the behaviour of different imaging parts of an image sensor, such as a portable image sensor, by having the different image sensor elements imaging the same test pattern (or one or more subunits of a test pattern). The mapping can be stored in a look-up table and used to compensate for non-uniform behaviour of the image sensor, such as the portable image sensor.

Additionally or alternatively, there can be a primary reference point and at least one secondary reference point located at a fixed position with respect to the test pattern, and the method can further comprise the step of relative movement between the image sensor, such as the portable image sensor, and the primary reference point until the primary reference point overlaps the secondary reference point. This step can include moving the image sensor, such as the portable image sensor, until the primary reference point overlaps the secondary reference point.

Additionally or alternatively, the method can comprise the secondary reference points being any of visual markings, auditive queues, icons, text messages or haptic signals.

Additionally or alternatively, the method can comprise the step of providing a visual or audible confirmation when the primary reference point overlaps the secondary reference point.

Additionally or alternatively, the method can comprise the step of triggering the capturing of an image of the test pattern when the primary reference point overlaps the secondary reference point.

This has the advantage that it provides a method for guiding the image capturing. For example, it can insure that a large number of image sensor elements is used to image the test pattern.

Additionally or alternatively, one image sensor element of a first set of image sensor elements can be located at or in the centre of the image sensor area, and one image sensor element of at least a second set of image sensor elements, different from the first set, can be located on a line between the centre and an extremity of the image sensor area. The method can comprise the steps of acquiring an image of the test pattern with the first and the at least one second set of image sensor elements. Additionally, one image sensor element of the at least a second set of image sensor elements can be located at an extremity.

This has the advantage of mapping system fall-off effects in the image from the centre of the image sensor, such as the portable image sensor, towards the outer edges of the image sensor, such as the portable image sensor.

Additionally or alternatively, the step of capturing the image of the test pattern can be repeated a plurality of times using different sets of image sensor elements, wherein for each of the sets of image sensor elements the method extracts the property value.

When all property values have been extracted, the method can further comprise the step of: averaging the property value over all extracted property values, and assigning the average property value to all sets of image sensor elements.

This gives the advantage of averaging out noise and other variations between the different image sensor elements, so that the image sensor, such as the portable image sensor, gives the same response for the same test pattern, independently of the location within the image sensor, such as the portable image sensor.

Additionally or alternatively, the property value can be at least one of the image sensor luminance or the image sensor color point.

Additionally or alternatively, the test pattern can be output by a display or it can be implemented on a sheet comprising paper or other natural fibres, polymers or metals.

Additionally or alternatively, the method can further comprise the step of imaging a sequence of test patterns such that the imaging can be synchronized with the display outputting the sequence.

This has the advantage of providing an automatic imaging sequence.

In another embodiment of the present invention there is provided a system for mapping non-uniformities of an image sensor, such as a portable image sensor, comprising image sensor elements in an image sensor area, whereby each image sensor element can have a coordinate and be configured to image a property from a test pattern, whereby the system can be configured to implement, for at least two different sets of image sensor elements imaging the same test pattern, positioning the image sensor, such as the portable image sensor, such that the set of image sensor elements images the test pattern, capturing an image of the test pattern, registering the property from the test pattern and image sensor element coordinate, and mapping the non-uniformities of the image sensor, such as the portable image sensor, by storing the values of each registered property and image sensor element coordinate in a look-up table.

The system is preferably configured for moving the image sensor, such as the portable image sensor, and positioning the image sensor, such as the portable image sensor, such that the set of image sensor elements can image the test pattern. Thus, the system can be configured to implement, for at least two different sets of image sensor elements imaging the same test pattern, moving the image sensor, such as the portable image sensor, and positioning the image sensor, such as the portable image sensor, such that the set of image sensor elements images the test pattern, capturing an image of the test pattern, registering the property from the test pattern and image sensor element coordinate, and mapping the non-uniformities of the image sensor, such as the portable image sensor, by storing the values of each registered property and image sensor element coordinate in a look-up table.

In addition, the system can be configured for relative movement of the image sensor, such as the portable image sensor, with respect to the test pattern and this relative movement will position the image sensor, such as the portable image sensor, so that the set of image sensor elements can image the test pattern.

Thus, the system can be configured to implement, for at least two different sets of image sensor elements imaging the same test pattern, moving relatively the image sensor, such as the portable image sensor, with respect to the test pattern and positioning the image sensor, such as the portable image sensor, such that the set of image sensor elements images the test pattern, capturing an image of the test pattern, registering the property from the test pattern and image sensor element coordinate, and mapping the non-uniformities of the image sensor, such as the portable image sensor, by storing the values of each registered property and image sensor element coordinate in a look-up table.

The system enables the possibility to map the behaviour of different imaging parts of an image sensor, such as a portable image sensor, by having the different image sensor elements imaging the same test pattern. This can be done for one or more subunits of a test pattern. The mapping can be stored in a look-up table and used to compensate for non-uniform behaviour of the image sensor, such as the portable image sensor.

Additionally or alternatively, the imaging area can comprise a primary reference point in the imaging area and at least one secondary reference point at a fixed position relative to the test pattern such that an imaging position can be defined for the image sensor, such as the portable image sensor, when there is an overlap between the primary reference point and a secondary reference point.

Additionally or alternatively, the reference points can be any of visual markings, auditive queues, icons, text messages or haptic signals.

Additionally or alternatively, the system can be configured to provide a visual or audible confirmation to the image sensor, such as the portable image sensor, when there can be an overlap between the primary reference point and the secondary reference point.

Additionally or alternatively, the system can be configured to immediately capture an image of the test pattern with the image sensor, such as the portable image sensor, when there is an overlap between the primary reference point and the secondary reference point. This has the advantage that it provides a method for guiding the image capturing. For example, it can insure that a large number of image sensor elements are used to image the test pattern.

Additionally or alternatively, the image sensor, such as the portable image sensor, can be configured to acquire an image of a test pattern with a first and an at least one second set of image sensor elements, wherein one image sensor element of the first set of image sensor elements can be located in the centre of the image sensor area, and one image sensor element of at least the second set of image sensor elements, different from the first set, can be located on a line between the centre and an extremity of the image sensor area. Additionally or alternatively, the extremity can be an edge or a corner of the image sensor area.

Additionally or alternatively, one image sensor element of the at least a second set of image sensor elements can be located at an extremity of the image sensor area. This has the advantage of providing a system for mapping system fall-off effects in the image from the centre of the image sensor, such as the portable image sensor, towards the outer edges of the image sensor, such as the portable image sensor.

Additionally or alternatively, the image sensor, such as the portable image sensor, can be configured to capture the image of the test pattern repeatedly a plurality of times using different sets of image sensor elements, wherein for each of the sets of image sensor elements a property value can be extracted, and the system can be configured to average the property value of all extracted property values, and to assign the average property value to all sets of image sensor elements.

This gives the advantage of providing a system for averaging out noise and other variations between the different image sensor elements, so that the image sensor, such as the portable image sensor, gives the same response for the same test pattern, independently of the location within the image sensor, such as the portable image sensor.

Additionally or alternatively, the image sensor property can be luminance or color.

Additionally or alternatively, the system can comprise a display and wherein the test pattern can be outputted on the display or it can be implemented on a sheet comprising paper or other natural fibres, polymers or metals.

Additionally or alternatively, the display can be configured to output a sequence of test patterns in synchronization with the acquisitions of the sequence by the image sensor, such as the portable image sensor.

This has the advantage of providing a system for an automatic imaging sequence.

Additionally or alternatively, the test pattern can comprise subunits, whereby each can have at least the size of an image sensor element.

In another embodiment of the present invention, there is provided a system for mapping non-uniformities of an image sensor, such as a portable image sensor, each of these comprising image sensor elements in an image sensor area, each image sensor element can have a coordinate and be configured to image a property from a test pattern, the system can be configured to implement, for at least two different sets of image sensor elements imaging the same test pattern the following, means for positioning the image sensor, such as the portable image sensor, such that the set of image sensor elements images the test pattern, means for capturing an image of the test pattern, means for registering the property from the test pattern and image sensor element coordinate, and means for mapping the non-uniformities of the image sensor, such as the portable image sensor, by storing the values of each registered property and image sensor element coordinate in a look-up table.

The system preferably has means for moving the image sensor, such as the portable image sensor, as well as means for positioning the image sensor, such as the portable image sensor, such that the set of image sensor elements can image the test pattern. Thus, the system can be configured to implement, for at least two different sets of image sensor elements imaging the same test pattern, the following, means for moving the image sensor, such as the portable image sensor, and positioning the image sensor, such as the portable image sensor, such that the set of image sensor elements images the test pattern, means for capturing an image of the test pattern, means for registering the property from the test pattern and image sensor element coordinate, and means for mapping the non-uniformities of the image sensor, such as the portable image sensor by storing the values of each registered property and image sensor element coordinate in a look-up table.

The system may comprise means for relative movement between the image sensor, such as the portable image sensor, and the test pattern, and positioning the image sensor, such as the portable image sensor, relative to the test pattern such that the set of image sensor elements images the test pattern, means for capturing an image of the test pattern, means for registering the property from the test pattern and image sensor element coordinate, and means for mapping the non-uniformities of the image sensor, such as the portable image sensor, by storing the values of each registered property and image sensor element coordinate in a look-up table.

The system enables the possibility to map the behaviour of different imaging parts of an image sensor, such as a portable image sensor, by having the different image sensor elements imaging the same test pattern (or one or more subunits of a test pattern). The mapping can be stored in a look-up table and used to compensate for non-uniform behaviour of the image sensor, such as the portable image sensor.

Additionally or alternatively, the imaging area can comprise a primary reference point in the imaging area and at least one secondary reference point at a fixed position relative to the test pattern such that an imaging position can be defined for the image sensor, such as the portable image sensor, when there is an overlap between the primary reference point and a secondary reference point.

Additionally or alternatively, the reference points can be any of visual markings, auditive queues, icons, text messages or haptic signals.

Additionally or alternatively, the system can have means to provide a visual or audible confirmation to the image sensor, such as the portable image sensor, when there can be an overlap between the primary reference point and the secondary reference point.

Additionally or alternatively, the system can have means to immediately capture an image of the test pattern with the image sensor, such as the portable image sensor, when there is an overlap between the primary reference point and the secondary reference point. This discloses means for guiding the image capturing. For example, it can assure that a large number of image sensor elements is used to image the test pattern.

Additionally or alternatively, the image sensor, such as the portable image sensor, can have means to acquire an image of a test pattern with a first and an at least one second set of image sensor elements, wherein one image sensor element of the first set of image sensor elements can be located in the centre of the image sensor area, and one image sensor element of at least the second set of image sensor elements, different from the first set, can be located on a line between the centre and an extremity of the image sensor area.

Additionally or alternatively, the extremity can be an edge or a corner of the image sensor area.

Additionally or alternatively, one image sensor element of the at least a second set of image sensor elements can be located at an extremity.

This has the advantage of providing a system for mapping system fall-off effects in the image from the centre of the image sensor, such as the portable image sensor, towards the outer edges of the image sensor, such as the portable image sensor.

Additionally or alternatively, the image sensor, such as the portable image sensor, can have means to capture the image of the test pattern repeatedly a plurality of times using different sets of image sensor elements, wherein for each of the sets of image sensor elements a means for extracting a property value can be provided, and the system can have means to average the property value of all extracted property values and means to assign the average property value to all sets of image sensor elements.

This gives the advantage of providing a system for averaging out noise and other variations between the different image sensor elements so that the image sensor, such as the portable image sensor, gives the same response for the same test pattern, independently of the location within the image sensor, such as the portable image sensor.

Additionally or alternatively, the image sensor property can be luminance or color.

Additionally or alternatively, the system can comprise a display and wherein the test pattern can be outputted on the display or it can be implemented on a sheet comprising paper or other natural fibres, polymers or metals.

Additionally or alternatively, the display can be configured to output a sequence of test patterns in synchronization with the acquisitions of the sequence by the image sensor, such as the portable image sensor.

This has the advantage of providing a system for an automatic imaging sequence.

Additionally or alternatively, the test pattern can comprise subunits, each can have at least the size of an image sensor element.

In another embodiment of the present invention, there is provided a computer program product that can comprise software which, when executed on one or more processing engines, can perform any of the methods of the present invention. Additionally or alternatively, there can be an app comprising the computer program product.

Additionally or alternatively, there can be a non-transitory signal storage medium which can store the computer program product.

This has the advantage that the mapping procedure can be implemented in an app which can also have means to apply the resulting look-up table. The app can cooperate with the test pattern and define one or more reference points with respect to the test pattern.

BRIEF DESCRIPTION OF THE DRAWINGS

FIGS. 4a)-e) show an embodiment of the present invention comprising visual markers.

DEFINITIONS

An "image sensor" can be composed of subunits being "image sensor elements" (or pixels) which together can capture an image and transfer the information as electrical signals. The signals can be analog of digital. The amount (i.e. number) of image sensor elements can give the highest resolution of the captured image.

An image sensor can image a property of an object, e.g. a test pattern. Such property can comprise the behaviour of the reflected or emitted electromagnetic radiation of various wavelengths. For camera applications it is often wavelengths that are visible to the human eye that are considered. A common measure of the radiation is luminance.

A "portable image sensor" can be an image sensor embedded in a computational processing device, such as e.g. laptops, mobile phones, smartphones, tablets, palm pads and the like. In the present context it may also include a stationary computer. The computational processing device has means for providing content that can be outputted on an internal or external display device.

The "non-uniformity" of an image sensor having image sensor elements (or pixels) can comprise the variation of a certain property, for example output luminance or color hue, across the different image sensor elements (or pixels). This will result in that different parts of the image sensor, such as the portable image sensor, will acquire different values of the property.

A "test pattern" can comprise a variety of features having shapes, colors and gradients especially designed for characterising the behaviour of image sensor elements. The test pattern can be outputted on an electronic display or on solid sheets made from e.g. paper or other natural fibres, polymers or metals.

An "image feature" is a portion of a test pattern from which a property can be retrieved. If an image feature is larger than an image sensor element, it can be imaged with a plurality or set of image sensor elements.

A "subunit" can be defined as the smallest distinguishable feature of the test pattern as imaged by the image sensor, having at least the size of an image sensor element.

"Distortion" may arise from optical aberration and result in that straight continuous lines of an object to be imaged are not reproduced as straight lines but, for example, as bended or discontinuous lines.

A "software application" or "app" can be a computer program product which is configured to handle exchange of data between devices in a digital or computerized system.

An app can be located on a remote application server and accessed via local clients. Apps can execute dedicated tasks on computerized devices.

"Lens fall-off" or "vignetting" corresponds to the darkening of the corners of an image due to light fall off. Lens fall-off can be due to the image sensor (the image sensor elements can be less sensitive to light when it hits the sensor at an angle), to the optics such as the lens itself.

A "reference point" or a virtual point can be a position defined by the distance to a fixed reference point. For example, a fixed reference point within an image sensor area can be the centre or an edge of the image sensor area. A reference point can then be any point at a certain distance from this fixed reference point, or the fixed reference point itself. A fixed reference point of an image, e.g. a test pattern, can, for example, be the centre of the test pattern or an edge of the test pattern. It can also be a point located outside the test pattern, as long as the distance between the fixed reference point and the test pattern does not change.

A "portable device" comprises an image sensor such as a camera and a display. The image sensor or camera can operate as an optical scanner. A "portable device" can be a palm pad, PDA, laptop, smartphone, tablet, for example. The camera comprises an image sensor with a field of view, and an active display area. The portable device can also comprise a computer program product, e.g. a smartphone application or a smartphone "app" or software app. The portable device can have at least one of the following deficiencies:

Optical non-uniformities in a camera system such as a laptop, tablet, PDA, palm pad, mobile phone, or smartphone camera system: for example, a smartphone camera has optical non-uniformities that need to be compensated for (e.g. unknown lens fall-off).

With reference to image sensor element noise and image sensor element variability of a camera image sensor, such as a smartphone image sensor: The smartphone sensor typically has higher image sensor element noise than high quality measurement equipment. This needs to be corrected, preferably.

Camera parameters related challenges: camera settings (gain/offset/integration time) need to be controlled and carefully configured.

Spectral sensitivity challenges: cameras such as smartphone cameras have non-perfect and unknown (device dependent) spectral sensitivities. Therefore, color (and luminance) measurements are inherently unreliable.

A "barcode" is a representation of data in a visual, machine-readable form. The barcode encodes the data which can be recovered by reading the barcode. A barcode can be a one—or two-dimensional pattern that can be read and interpreted by machine visioning means. For example, barcodes can represent data by varying the widths and spacings of parallel 30 lines. These are linear or one-dimensional (1D) barcodes that can be scanned by special optical scanners, such as a barcode readers. In addition, there are two-dimensional barcodes such as QR codes which can make use of shapes such as squares, rectangles, triangles, hexagons, dots, circles, bars, rectangles, dots, and other geometric patterns to code for data. These patterns are called matrix codes or 2D barcodes. For example, 2D barcodes can be read or deconstructed using an application running on a portable device such as a mobile phone, NDA, PDA, smartphone, palm pad, tablet etc. e.g. with a inbuilt camera which operates as a scanner. The subunits of a barcode carry encoded information, or the encoded data, which can be decoded with a barcode scanner. For example, a QR code area can comprise markings for
- positioning (orientation)
- size of the data matrix
- QR code version
- actual data
- outer limit at the end of the code area.

A "computer program product" can be a software application for running on a processor such as an application for a smartphone or it can be a smartphone "app" or software app in general.

Any reference to "relative movement" includes changes of position in any direction as well as changes in orientation of a test pattern and a mobile device or an image sensor. Hence, the test pattern may be held stationary and the position or orientation of the mobile device or the image sensor, such as the portable image sensor, can be changed or the position or orientation of the test pattern may be changed and the position or orientation of the mobile device or the image sensor, such as the portable image sensor, can be held stationary, or the position or orientation of both the test pattern and the image sensor, such as the portable image sensor, can be changed.

DETAILED DESCRIPTION OF THE INVENTION

Embodiments of the present invention provides a solution by means of a reliable system for performing QA (quality assurance) and calibration of visualization systems based on a smartphone (or tablet, PDA, palm pad, mobile phone, laptop, etc.) camera measurements. At least one problem, or more problems or all of the following problems can be solved by embodiments of the present invention:
1) Optical non-uniformities in a camera system such as a camera on a portable device such as a smartphone camera system: A camera such as a smartphone camera has optical non-uniformities in the images it produces, that need to be compensated for (e.g. to compensate for unknown lens fall-off).
2) image sensor element noise and image sensor element variability of a camera image sensor such as a smartphone image sensor: The image sensor, such as the smartphone sensor, typically has higher image sensor element noise than high quality measurement equipment. It is preferable for this to be corrected.
3) Camera parameters related challenges: camera settings (gain/offset/integration time) need to be controlled and carefully configured.
4) Spectral sensitivity challenges: cameras such as smartphone cameras have non-perfect and unknown (device dependent) spectral sensitivities. Therefore, color (and luminance) measurements are inherently unreliable.

Thus, an objective of embodiments of the present invention is to provide a reliable calibration system for a visualisation device, such as a room display, with a portable device comprising a camera and a display, the device having at least one of the deficiencies listed above in items 1), 2), 3) and/or 4). This can be obtained by performing the below four steps of an embodiment of the present invention.
1. Setting up the connection. The display to be calibrated and the portable device are connected. The devices can be connected to a server that can host a calibration application.
2. Defining optimal settings of the image sensor parameters. The aim of this step is to find image sensor parameters (e.g. gain, offset, integration time, etc.) that give the best possible imaging of different test patterns.

3. Performing a controlled measurement sequence on a test pattern. The principle of this step is to image the same part of a test pattern shown on the room display 2, with different image sensor elements of the image sensor 7. In this way, the differences between the image sensor elements can be mapped.

4. Using the differences of step 3 to set up a calibration mapping. In this step the differences obtained in step 3 can be removed by, for example, averaging.

Figure 3:
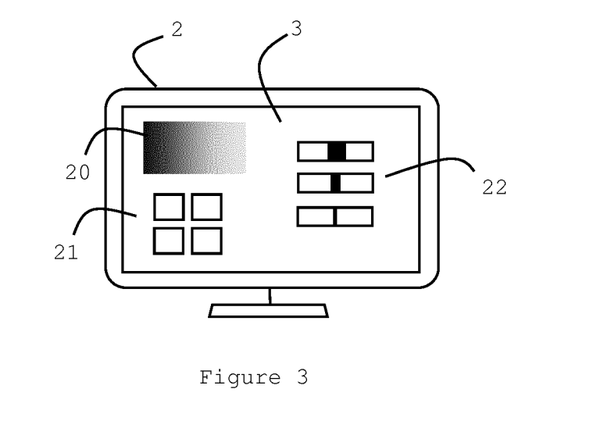
FIG. 3 shows an embodiment of the present inventions comprising different test patterns.

When the 4 steps have been performed, the portable device can be used for e.g. calibrating or testing a display, e.g. the room display 2. The test patterns used in this subsequent calibration or testing procedure can also be used when calibrating the portable device 2. FIG. 3 shows an embodiment of the present invention comprising some examples of test patterns: A luminance test pattern 20 with a gradient from black to white, a color test pattern 21 having patches of e.g. color red, green, blue and white, a resolution target 22 with varying thickness of the central black bar.

The 4 steps will now be described in more detail.

1. Setting Up the Connection

The first step of the method according to the present invention is to set up a connection between a portable device and the visualisation system or room display device to be calibrated or tested. The portable device will have an image sensor.

Figure 1:
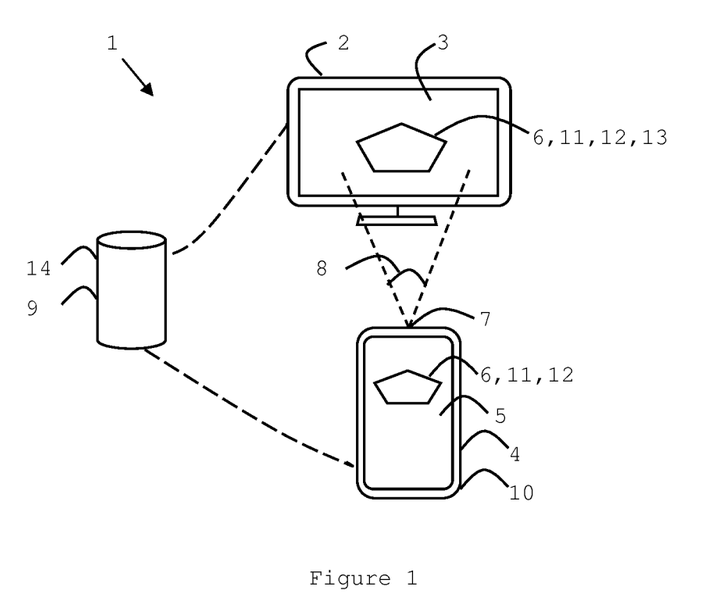
FIG. 1 shows a system for display calibration.

FIG. 1 shows an embodiment of the present invention comprising a setup 1 having a room display 2 having an active display area 3 and a portable device 4, e.g. a smartphone or other mobile device as disclosed above, having an image sensor 7 with a field of view 8, and an active display area 5. The portable device 4 can also comprise a computer program product 10, e.g. a smartphone application or a smartphone "app" or software app. The room display 2 outputs a content 6 on its active display area 3. The content 6 is imaged by the image sensor 7 and outputted on the display area 5 of the portable device 4. The content 6 can e.g. be a QR code or barcode 11, a test pattern, or arbitrary image or video content. The room display 2 and the portable device 4 can be connected to a server 9 comprising a calibration application 14. An overall aim of embodiments of the present invention can be to make sure that the image sensor 7 of the portable device 4 exhibits sufficiently uniform behaviour so that it can be used to perform a quality assurance check or calibration of a display, e.g. the room display 2. The content 6 may be a test pattern, for example as shown in FIG. 3.

A connection is made between the portable device 4 and the room display 2. This can be done, for example, by generating a barcode, e.g. a QR code or barcode 11, and showing this code on the room display 2. The portable device 4 can then read the barcode 11, e.g. via an app 10 that provides information on which display has generated the code and the identity of the display to be calibrated or tested.

From an architectural point of view, the room display 2 can be part of a system comprising:

a. a workstation with web browser and a web application to connect to a server (where the calibration application is running), or b. a standalone application running on the workstation, and the workstation or display also being connected to the portable device 4 via a channel such as wifi, Bluetooth, . . . for communicating with the portable device 4, or c. a standalone application running on the workstation but connecting to the server for exchanging information with the portable device 4, or d. any of the above is possible, but where the application or web browser runs inside the room display 2 instead of on the workstation.

2. Defining Optimal Settings of the Image Sensor Parameters

The second step of the method according to embodiments of the present invention comprises finding optimal settings of the image sensor parameters.

An aim of this step can be to find image sensor parameters (e.g. gain, offset, integration time, etc.) that can provide the best possible imaging of the different test patterns.

In the setup of FIG. 1, a series of different test patterns 12 will be shown on the display 2 and imaged by the image sensor 7 of the portable device 4. Each of the test patterns may be imaged a multiple of times while using different sets of parameters of the image sensor, for example comprising gain,
offset,
integration time,
focus,
filter or spectral settings,
position/orientation of the image sensor.

Figure 2:
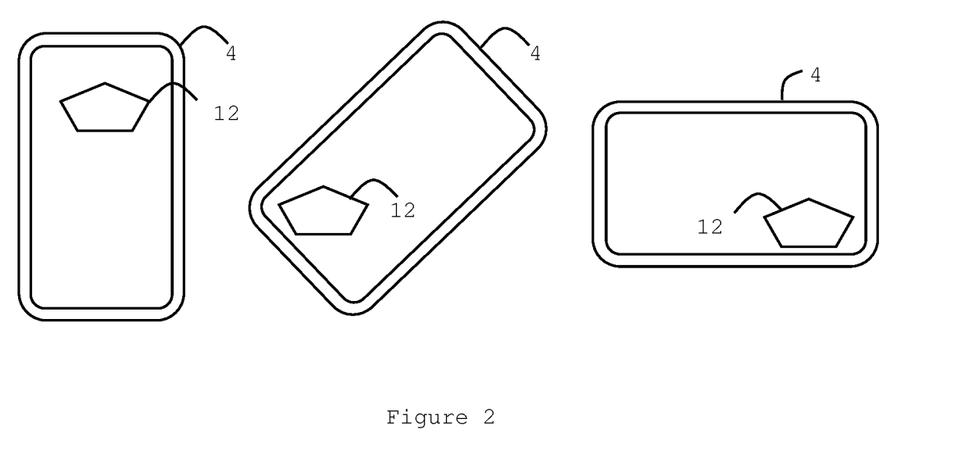
FIG. 2 shows an embodiment of the present invention comprising different positions of the camera sensor.

The image sensor can be brought in different positions and/or orientations by physically moving the image sensor (or housing of the image sensor). Alternatively, the image sensor can be brought in different positions and/or orientations relative to the test pattern. One option is physically moving the image sensor (or housing of the image sensor). Alternatively, the image sensor or the test patterns or both may be moved relatively to each other. Hence, the test pattern can be moved and the image sensor, such as the portable image sensor, can be held stationary, or vice versa or they can both be moved. FIG. 2 shows an embodiment of the present invention comprising the portable device 4 imaging the test pattern 12 while adopting three different positions. The test pattern 12 can have any arbitrary shape and position on the active display area 3. Alternatively, a multiple of different test patterns like 12 can be arranged into a sequence of test patterns 13.

There can be synchronization between the image sensor 7 and the calibration application 14 that renders and outputs a sequence of test patterns 13 on the room display 2. In this way, the test patterns 13 can be shown in a stable way when the image sensor 7 acquires one or more images. Additionally or alternatively, each of the test patterns 13 can be tagged with e.g. a QR code such that the portable device 4 can identify the individual patterns being imaged. The generation of a sequence of test patterns 13 can be a dynamic process wherein the parameter settings depend on the acquired images. For example: A series of images could be acquired with consecutively increasing exposure time until the optimal exposure time has been found.

The image sensor 7 as used in any embodiments of the present invention can be a portable image sensor, e.g. the image sensor may be located in a mobile device, e.g. a camera in the mobile device.

There can be a desired accuracy defined upfront, for example described as a maximum error in a chosen color metrics (e.g. DeltaE2000) that can be accepted. The stop criterion can then be when the desired accuracy is reached. A typical value can be, for example, 2 DeltaE2000 units.

3. Performing a Controlled Measurement Sequence on the Acquired Test Patterns.

The third step of the method according to the present invention comprises performing a controlled measurement sequence on test patterns. The principle of this step is to image the same part of a test pattern 12 shown on the room display 2, with different image sensor elements of the image sensor 7 or a different one. In this way, the differences between the image sensor elements can be mapped.

FIG. 4a)-e) shows an embodiment of the present invention comprising a controlled measurement sequence.

The image sensor 7 of the portable device 4 can acquire an image 30 of the display 2. FIG. 4a) shows how markers 31-35 are overlaid onto the image 30. The markers can originate from an executed computer program product (e.g. an "app"). The portable device can then be moved into various positions (e.g. by assistance of a user or a mechanical device) by following certain instructions.

Figure 4:
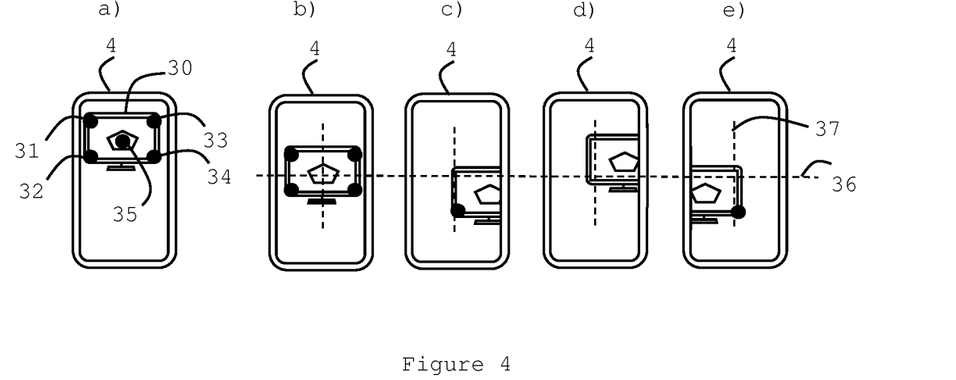

In the present example of FIG. 4, such instruction can comprise to consecutively point the centre of the image sensor towards each marker of a sequence of markers. The centre of the image sensor is shown as the intersection of the dashed lines, e.g. as line 36 and 37 in FIG. 4e). Alternatively, the relative positions or orientations of the portable device with respect to the test patterns can be changed so as to consecutively point the centre of the image sensor towards each marker of a sequence of markers. Hence, the portable device can be moved and the test patterns held stationary or the test patterns can be moved and the portable device can be held stationary or they can both be moved, in all cases to consecutively point the centre of the image sensor towards each marker of a sequence of markers.

For each successful alignment between the centre of the image sensor and a marker, one or more image(s) can be taken and the corresponding marker can be removed or made invisible or updated (e.g. being changed in appearance, e.g. greyed out or change of color or pattern, etc.) to confirm that it has been used. Table 1 shows an example for when a marker is removed in the steps 4a) to 4e).

TABLE 1

| FIG. | Additional marker removed |
|---|---|
| 4a) | none |
| 4b) | 35 |
| 4c) | 31 |
| 4d) | 32 |
| 4e) | 33 |

The alignment criteria can comprise that the image sensor 7 is positioned in a suitable viewing angle to the room display 2 in order to limit the image warping distortion. If the angle becomes too large, then it will be difficult to perform the pattern detection correctly due to the distortion of the pattern. Further, a display has viewing angle dependent characteristics where the luminance and color changes when observed under an angle to the display surface normal compared to when observed in the direction of the display surface normal. Modern displays have a fairly stable behaviour for angles up to 60-70° from the display surface normal. However, when looking at larger angles, the measured values will no longer represent the display behaviour in the direction of the display surface normal.

The image sensor 7 as used in any embodiments of the present invention, can be a portable image sensor, e.g. the image sensor may be located in a mobile device, e.g. a camera in the mobile device.

The markers can be shown one by one sequentially or they can be shown together, depending on whether the controlled measurement sequence demands that a specific trajectory/sequence is followed by the camera or whether a correct position (independent of the order) is sufficient.

A preferred implementation of the method of the present invention is to have the calibration application which runs on the portable device 4 automatically take acquisitions when the camera is correctly positioned with respect to each of the markers. This avoids the user to have to manually start an acquisition.

The exact number of markers shown in overlay, and their exact locations can depend on the desired conditions under which the controlled measurement sequence needs to be performed. The markers do not necessarily need to be placed in overlay of the display itself, they could also be placed in open space "outside" the display. Also, these markers do not necessarily need to be placed in a symmetrical way, meaning that there is a kind of symmetry in the marker positions. Instead of markers, it is also possible to show a full trajectory indication, e.g. a line, which needs to be followed.

If the markers are positioned further away, the viewing angle under which the images of the display are acquired is increased. Adding more markers would have as a consequence that more acquisitions are done, potentially at more viewing angles, and thereby resulting in more overlaps between the different acquisitions.

The present invention is not limited to visual markers. Other guidance can be provided by an indication to e.g. move forward or backwards, to tilt/rotate the image sensor, such as a portable image sensor, to move the camera left/right/up/down in a lateral movement. This could be implemented by using icons, markers, auditive queues etc. Instead of moving the image sensor, such as the portable image sensor, the relative position or orientation of the image sensor, such as the portable image sensor with respect to the test pattern can be changed. Hence, the image sensor, such as the portable image sensor, can be moved and the test pattern held stationary or the image sensor, such as the portable image sensor, can be held stationary and the test pattern can be moved or they can both be moved For some or all of the test patterns to be characterized, a controlled measurement sequence can be followed in order to assure accurate measurements of the test pattern. Such a controlled measurement sequence can involve changing the position of the image sensor such as the portable image sensor e.g. (movements horizontal, vertical), changing the orientation/rotation, changing the magnification level (zoom) of the image sensor, such as the portable image sensor, changing the distance of the image sensor, such as the portable image sensor, to the display under test, changing image sensor settings (offset, gain, exposure time, if applicable [spectral] filter settings) in between different image sensor acquisitions. Any of these movements can be changes in relative positions or orientations.

In one implementation, the test patterns can be shown one after the other, and for each test pattern, a controlled measurement sequence is applied. In another implementation it can be that while going through the measurement sequence, for each (or some) step(s) of the controlled measurement sequence, multiple test patterns are shown. Or in yet another implementation a combination of the previous two approaches is possible (e.g. performing the entire controlled measurement sequence on some images with test patterns, such as moving images, while showing various static images with test patterns for a selected setting of the controlled measurement sequence).

4. Using the Differences of Step 3 to Set Up a Calibration Mapping.

In this step the differences obtained in step 3 can be removed by e.g. averaging between the obtained values. A fundamental reason for obtaining several acquisitions (same test pattern at different positions of the image sensor, such as the portable sensor) in a controlled way in step 3 can be that by means of combining these acquisitions it is possible to obtain reliable luminance and color measurements with an image sensor, such as a portable device image sensor, (which are impossible to obtain by means of a single acquisition).

According to a preferred embodiment, the following processing steps can be performed individually, consecutively or in parallel, to combine multiple acquisitions:

a. Solving the Problem of Portable Device Lens Fall-Off

By selecting the position of the markers in such a way that (each part of) the test pattern shown on the display will be imaged at least substantially along an axis and preferably in at least one corner. For example, a part of the test pattern can be imaged consecutively by adjacent image sensor elements on a line comprising both the centre and the edge of the total image sensor area. The procedure can be repeated for different parts of a test pattern in order to increase accuracy.

By combining (stitching or weighted stitching) it is possible to generate an acquired image corrected for (unknown) lens fall-off. For example, the values can be normalized with respect to the centre value. In case different test patterns have been used, the values can be normalized with respect to the average of all centre values.

b. Solving the Problem of Portable Device Image Sensor Element Noise:

Since a given (part of the) test pattern will be imaged multiple times, and with different image sensor elements of the image sensor, such as the portable device image sensor, it is possible to average out the image sensor element values of these multiple acquisitions and as such remove the noise present in consumer portable device cameras. This means that a mapping needs to be performed in order to determine which part of the test pattern is being imaged by which individual image sensor element. All acquisitions done by image sensor elements corresponding to a specific part of the test pattern can be averaged out and therefore the camera image sensor element noise can be eliminated. The image sensor element noise refers to in the present context to both luminance and color noise.

It is recommended that first the correction step for lens fall-off (or lens non uniformities in general) is performed before performing processing steps that involve individual image sensor element noise reduction.

Based on the reliable measurement images generated in step 4, the normal calibration & QA steps can then be performed on these images to calibrate or to perform quality assurance tests on the display.

Additionally or alternatively, it is possible to use database values for spectral compensation of the portable device.

Additionally, big data analysis can be performed by storing all measurement data and using this as a source of information.

Additionally or alternatively, an additional transparent calibration chart can be attached to the bezel and be backlit with light of the same spectral characteristics as the spectrum being emitted by the display, or by the display backlight itself. The calibration charts can comprise at least some color patches that correspond to the spectral characteristics of at least one of the primary colors of the display. The backlight can have an additional color source that is very stable in spectrum over time and that is only activated during a calibration or quality assurance action. By sequentially enabling/disabling the backlight of the calibration chart it is possible to very accurately calibrate the spectral behaviour of the image sensor, such as the portable image sensor.

The invention claimed is:

1. A method for mapping non-uniformities of an image sensor comprising image sensor elements in an image sensor area, each image sensor element having a coordinate and being configured to image a property from a test pattern, and wherein the test pattern has one or more subunits, the method comprising the steps of:

for at least two different sets of image sensor elements imaging the same one or more subunits of the test pattern, relative moving of the image sensor and the one or more subunits of the test pattern and positioning the image sensor and the one or more subunits of the test pattern relative to each other such that the at least two different sets of image sensor elements image the one or more subunits of the test pattern, capturing an image of the one or more subunits of the test pattern by each of the at least two different sets of image sensor elements, registering the property from the one or more subunits of the test pattern and image sensor element coordinate, mapping the non-uniformities between the at least two different sets of image sensor elements by storing values of each registered property and image sensor element coordinate for the one or more subunits of the test pattern in a look-up table, and calibrating at least one of the at least two different sets of image sensor elements for the property based on the mapped non-uniformities between the at least two different sets of image sensor elements.

2. The method according to claim 1, wherein the relative moving step comprises moving the image sensor such that the set of image sensor elements images the one or more subunits of the test pattern, or includes holding the image sensor stationary and moving the one or more subunits of the test pattern such that the set of image sensor elements images the one or more subunits of the test pattern, or both the image sensor and the one or more subunits of the test pattern are moved such that the set of image sensor elements images the one or more subunits of the test pattern.

3. The method according to claim 1, wherein the image sensor area comprises a primary reference point and at least one secondary reference point located at a fixed position with respect to the one or more subunits of the test pattern, and the method further comprises the step of moving the image sensor until the primary reference point overlaps the secondary reference point.

4. The method according to claim 3, wherein the secondary reference points are any of visual markings, auditive queues, icons, text messages or haptic signals, or further comprising the step of providing a visual or audible confirmation when the primary reference point overlaps the secondary reference point.

5. The method according to claim 3, further comprising the step of triggering the capturing of an image of the one or more subunits of the test pattern when the primary reference point overlaps the secondary reference point.

6. The method according to claim 1, wherein one image sensor element of a first set of image sensor elements is located in the centre of the image sensor area, and one image sensor element of at least a second set of image sensor elements, different from the first set, is located on a line between the centre and an extremity of the image sensor area, the method comprising the step of acquiring an image of the one or more subunits of the test pattern with the first and the at least one second set of image sensor elements.

7. The method according to claim 6, wherein the extremity is an edge or a corner of the image sensor area.

8. The method according to claim 6, wherein one image sensor element of the at least a second set of image sensor elements is located at an extremity.

9. The method according to claim 1, wherein the step of capturing the image of the one or more subunits of the test pattern is repeated a plurality of times using different sets of image sensor elements, wherein, for each of the sets of image sensor elements, the method extracts the property value.

10. The method according to claim 9, further comprising, when all property values have been extracted, the step of
averaging the property value over all extracted property values, and
assigning the average property value to all sets of image sensor elements.

11. The method according to claim 1, wherein the property is at least one of the image sensor luminance or the image sensor color point.

12. The method according to claim 1, wherein the one or more subunits of the test pattern is outputted by a display, or wherein the one or more subunits of the test pattern is implemented on a sheet comprising paper or other natural fibres, polymers or metals.

13. The method according to claim 9, further comprising the step of imaging a sequence of test pattern parts such that the imaging is synchronized with the display outputting the sequence.

14. A system for mapping non-uniformities of an image sensor comprising image sensor elements in an image sensor area, each image sensor element having a coordinate and being configured to image a property from a test pattern, wherein the test pattern has one or more subunits,
wherein the system is configured to implement the steps of, for at least two different sets of image sensor elements imaging the same one or more subunits of the test pattern,
moving the image sensor and the one or more subunits of the test pattern relative to each other and positioning relative positions of the image sensor and the one or more subunits of the test pattern such that the at least two different sets of image sensor elements image the one or more subunits of the test pattern,
capturing an image of the one or more subunits of the test pattern by each of the at least two different sets of image sensor elements,
registering the property from the one or more subunits of the test pattern and image sensor element coordinate, and
mapping the non-uniformities between the at least two different sets of image sensor elements by storing the values of each registered property and image sensor element coordinate between the at least two different sets of image sensor elements in a look-up table, and
calibrating at least one of the at least two different sets of image sensor elements for the property based on the mapped non-uniformities between the at least two different sets of image sensor elements.

15. The system according claim 14, wherein moving the image sensor and the one or more subunits of the test pattern relative to each other is moving the image sensor such that the set of image sensor elements images the one or more subunits of the test pattern, or includes holding the image sensor stationary and moving the test pattern such that the set of image sensor elements images the one or more subunits of the test pattern, or both the image sensor and the one or more subunits of the test pattern are moved such that the set of image sensor elements images the one or more subunits of the test pattern.

16. The system according claim 14, wherein the imaging area comprises a primary reference point in the imaging area and at least one secondary reference point at a fixed position relative to the one or more subunits of the test pattern such that an imaging position is defined for the image sensor when there is an overlap between the primary reference point and a secondary reference point.

17. The system according claim 14, wherein the image sensor is configured to acquire an image of the one or more subunits of the test pattern with a first set of image sensor elements and an at least one second set of image sensor elements, wherein one image sensor element of the first set of image sensor elements is located in the centre of the image sensor area, and one image sensor element of at least the second set of image sensor elements, different from the first set, is located on a line between the centre and an extremity of the image sensor area.

18. The system according claim 17, wherein the extremity is an edge or a corner of the image sensor area.

19. The system according claim 17, wherein one image sensor element of the at least a second set of image sensor elements is located at an extremity.

20. The system according claim 14, wherein the image sensor is configured to capture the image of the one or more subunits of the test pattern repeatedly a plurality of times using different sets of image sensor elements, wherein for each of the sets of image sensor elements a property value is extracted, and the system is configured to average the property value of all extracted property values, and to assign the average property value to all sets of image sensor elements.

21. The system according claim 14, wherein the image sensor property is luminance or color.

22. The system according claim 14, comprising a display and wherein the one or more subunits of the test pattern is outputted on the display or wherein the one or more subunits of the test pattern is provided by a sheet comprising paper or other natural fibres, polymers or metals.

23. The system according claim 14, wherein the one or more subunits, each have at least the size of an image sensor element.

24. A non-transitory storage medium storing a computer program product comprising software or an application which, when executed on one or more processing engines, performs the method of claim 1.

* * * * *